US011082531B2

(12) United States Patent
Reeve et al.

(10) Patent No.: US 11,082,531 B2
(45) Date of Patent: Aug. 3, 2021

(54) COMMUNICATION WITH AN APPLICATION FLOW IN AN INTEGRATION SYSTEM

(71) Applicant: International Business Machines Corporation, Armonk, NY (US)

(72) Inventors: John Anthony Reeve, Winchester (GB); Benjamin Graham Thompson, Eastleigh (GB); Trevor Clifford Dolby, Southampton (GB); Robert Convery, Fair Oak (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/686,387

(22) Filed: Nov. 18, 2019

(65) Prior Publication Data

US 2021/0152660 A1    May 20, 2021

(51) Int. Cl.
*H04L 29/08* (2006.01)
*H04L 29/06* (2006.01)

(52) U.S. Cl.
CPC .......... *H04L 67/327* (2013.01); *H04L 63/029* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 10,574,575 B2 * | 2/2020 | Rao | ........................ | H04L 43/026 |
| 2008/0228908 A1 * | 9/2008 | Link | ................... | H04L 41/0853 709/223 |
| 2009/0019157 A1 | 1/2009 | Suman | | |
| 2009/0168648 A1 * | 7/2009 | Labovitz | ................. | H04L 43/00 370/229 |
| 2010/0088414 A1 * | 4/2010 | Lin | ....................... | H04L 63/102 709/227 |

(Continued)

FOREIGN PATENT DOCUMENTS

| | | |
|---|---|---|
| CN | 107332744 A | 11/2017 |
| CN | 107659473 A | 2/2018 |
| CN | 109981810 A | 7/2019 |

OTHER PUBLICATIONS

"File Transfer Protocol", From Wikipedia, the free encyclopedia, This page was last edited on Oct. 20, 2019, 9 pages.

(Continued)

*Primary Examiner* — Uzma Alam
(74) *Attorney, Agent, or Firm* — Gilbert Harmon, Jr.

(57) ABSTRACT

Presented are concepts for configuring data communication with an application flow in an integration system, wherein various connection routes to an application flow may be offered to a client. By way of example, connection configuration information associated with an application flow may relate to a plurality of different connection routes that are available for the associated application flow. This connection configuration information may be dynamically maintained to reflect flow and connection route availability. When an application flow is requested by a client, the connection configuration information for that application flow may be provided to the client. This may enable the client to select a preferred route.

25 Claims, 7 Drawing Sheets

(56) References Cited

U.S. PATENT DOCUMENTS

| | | |
|---|---|---|
| 2014/0136680 A1* | 5/2014 | Joshi .................... H04L 43/026 |
| | | 709/224 |
| 2017/0063674 A1* | 3/2017 | Maskalik ................ H04L 47/20 |
| 2017/0201509 A1 | 7/2017 | Alewine |
| 2017/0257439 A1 | 9/2017 | Wang |
| 2017/0264460 A1 | 9/2017 | Coleman |
| 2018/0152519 A1 | 5/2018 | Agarwal |
| 2019/0132229 A1* | 5/2019 | McCormack ........ G05B 19/406 |
| 2021/0089292 A1* | 3/2021 | Patten, Jr. ................. G06F 8/65 |

OTHER PUBLICATIONS

"Peer-to-peer", From Wikipedia, the free encyclopedia, This page was last edited on Oct. 22, 2019, 17 pages.

International Search Report and Written Opinion, International Application No. PCT/IB2020/060697, International Filing Date Nov. 13, 2020.

* cited by examiner

COMMUNICATION WITH AN APPLICATION FLOW IN AN INTEGRATION SYSTEM

FIELD OF THE INVENTION

The present invention relates to application flows in an integration system, and more particularly, to configuring data communication with an application flow in an integration system. The present invention further relates to a connectivity component (such as a switch component for example) adapted to implement such a method.

BACKGROUND

Communication with an application flow across on-premise and off-premise platforms is required in Software as a Service (SaaS) environments and hybrid integration systems. SaaS is a software licensing and delivery model in which software is licensed on a subscription basis and is centrally hosted by an off-premise platform such as a shared computing resource or a cloud computing resource, e.g., accessible via the Internet. SaaS is typically accessed by users of an on-premise platform, e.g., using a thin client via a web browser. Hybrid integration systems deploy parts of the integration in an off-premise platform and other parts in an on-premise platform.

On-premise platforms are well-established and considered to provide improved security because data is stored and handled internally, e.g., within an internal private network. Off-premise platforms, such as, but not limited to, cloud computing resources are a relatively recent and evolving concept. Generally, reference to off-premise resources or platforms is taken to refer to a concept for enabling ubiquitous, convenient, and on-demand access via Internet to shared pools of configurable off-premise, e.g., remotely located, computing resources such as networks, applications, servers, storages, applications, functionalities, and the like which are accessible via the Internet. Conversely, reference to on-premise resources or platforms is taken to refer to a concept of local or private computing resources such as networks, servers, storage devices, application, etc. that are situated locally or within/behind a virtual boundary, often a firewall.

In hybrid integration systems, the ability to split integrations between different locations in the system, e.g., between a cloud-based server and an on-premise server, is critical for enabling true hybrid integration. Whichever approach is selected, requires choosing a particular transport protocol. However, a problem arises with callable flows, otherwise referred to as "application flows" or "integration flows," which describe the flow of data between applications and the processing performed on data inputs and outputs. To provide different qualities of service for the calls between flows, significant amounts of additional functionality must to be written in the components making up the callable flows, e.g., switch servers and agents. Also, current approaches for facilitating callable flows are not highly available and security is limited to the provided mechanisms.

SUMMARY

According to an embodiment of the present invention, a connectivity component for configuring data communication with an application flow in an integration system, the connectivity component comprising: an information store adapted to store connection configuration information associated with one or more application flows; a registration module adapted to receive connection configuration information associated with an application flow, wherein the received connection configuration information relates to at least two different connection routes to the associated application flow, and to add or remove the connection configuration information to/from the information store based on the availability of the application flow; a configuration component configured to identify stored connection configuration information for a first client based on an application flow to be connected to by the first client; and a communication component adapted to communicate the identified connection configuration information to the first client.

According to an embodiment of the present invention, a switch module, the switch module comprising: a connectivity component, wherein the connectivity component comprises: an information store adapted to store connection configuration information associated with one or more application flows; a registration module adapted to receive connection configuration information associated with an application flow, wherein the received connection configuration information relates to at least two different connection routes to the associated application flow, and to add or remove the connection configuration information to/from the information store based on the availability of the application flow; a configuration component configured to identify stored connection configuration information for a first client based on an application flow to be connected to by the first client; and a communication component adapted to communicate the identified connection configuration information to the first client.

According to an embodiment of the present invention, a server device, the server device comprising: a switch module, wherein the switch module further comprises: a connectivity component, wherein the connectivity component further comprises: an information store adapted to store connection configuration information associated with one or more application flows; a registration module adapted to receive connection configuration information associated with an application flow, wherein the received connection configuration information relates to at least two different connection routes to the associated application flow, and to add or remove the connection configuration information to/from the information store based on the availability of the application flow; a configuration component configured to identify stored connection configuration information for a first client based on an application flow to be connected to by the first client; and a communication component adapted to communicate the identified connection configuration information to the first client.

According to an embodiment of the present invention, a computer-implemented method for configuring data communication with an application flow in an integration system, the computer-implemented method comprising: storing, in an information store, connection configuration information associated with one or more application flows; receiving connection configuration information associated with an application flow, wherein the received connection configuration information relates to at least two different connection routes to the associated application flow; adding or removing the connection configuration information to/from the information store based on the availability of the application flow; identifying stored connection configuration information for a first client based on an application flow to be connected to by the first client; and communicating the identified connection configuration information to the first client.

According to an embodiment of the present invention, a computer program product for configuring data communication with an application flow in an integration system, the computer program product comprising: a computer readable storage medium having program instructions embodied therewith, the program instructions executable by a processing unit to cause the processing unit to perform a method comprising: storing, in an information store, connection configuration information associated with one or more application flows; receiving connection configuration information associated with an application flow, wherein the received connection configuration information relates to at least two different connection routes to the associated application flow; adding or removing the connection configuration information to/from the information store based on the availability of the application flow; identifying stored connection configuration information for a first client based on an application flow to be connected to by the first client; and communicating the identified connection configuration information to the first client.

BRIEF DESCRIPTION OF THE DRAWINGS

Preferred embodiments of the present invention will now be described, by way of example only, with reference to the following drawings, in which.

DETAILED DESCRIPTION

It should be understood that the figures are merely schematic and are not drawn to scale. It should also be understood that the same reference numerals are used throughout the figures to indicate the same or similar parts.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

Also, in the context of the present application, a (processing) system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

An "application" may be understood as being a processing resource, routine, set of instructions, data system, or processing construct which may be provided in a structured or ordered manner. A path may therefore be used to represent a location within a data storage construct, e.g., for the purpose of accessing an application instruction at a location within the construct. Using such an application, actions or events may be undertaken to access, modify, change, remove, alter, etc. files or data. Such events may include reading, writing, deleting, modifying, purging, appending or the like. Thus, when employed for integration between off-premise and on-premise resources, such as may be done in cloud-based provision of software to a user of an on-premise resource or as part of a SaaS environment, one or more of the instructions, routines or processes of an application may be accessed by an external system, thus requiring communication between the off-premise and on-premise resources.

Proposed are concepts for configuring data communication with an application flow in an integration system, wherein various connection routes to an application flow may be offered to a client. By way of example, connection configuration information associated with an application flow may relate to a plurality of different connection routes that are available for the associated application flow. This connection configuration information may be dynamically maintained to reflect flow and connection route availability. When an application flow is requested by a client, the connection configuration information for that application flow may be provided to the client. This may enable the client to select a preferred route, e.g., according to certain selection criteria or requirements, and the selected route may differ from a default route that would have otherwise been automatically used. In this way, such concepts may extend a conventional callable flow mechanism to cater for both the dynamic setting up of connection routes and the dynamic selection of connection routes.

By way of further example, proposed embodiments may employ a concept of registering information about accessing or making use of an application flow with a connectivity component. The connectivity component may then identify available connection routes for the application flow. By using such a registration concept, a data store of connection configuration information may be dynamically updated or maintained to reflect changes in available applications or severs. This may provide the advantage that callable application flows can be highly available.

For instance, proposed concepts may enable an on-premise application flow to be invoked by an off-premise application flow, and/or vice versa, wherein one of a plurality of possible connection routes may be offered to the invoking client. Applications that may benefit from being implemented on the off-premise systems may therefore be run in off-premise servers, whereas applications that may benefit from being implemented on the on-premise systems may be run in on-premise servers.

Illustrative embodiments may therefore provide concepts for communicating between off-premise resources and on-premise resources. Dynamic connection configuration and optimization may therefore be provided by proposed embodiments. Modifications and additional steps to a traditional SaaS implementation may also be proposed which may enhance the value and utility of the proposed concepts.

Illustrative embodiments may be utilized in many different types of distributed processing environments. In order to provide a context for the description of elements and functionality of the illustrative embodiments, the figures are provided hereafter as an example environment in which aspects of the illustrative embodiments may be implemented. It should be appreciated that the figures are only exemplary and not intended to assert or imply any limitation with regard to the environments in which aspects or embodiments of the present invention may be implemented. Many modifications to the depicted environments may be made without departing from the spirit and scope of the present invention. Moreover, the system may take the form of any of a number of different processing devices including client computing devices, server computing devices, a tablet computer, laptop computer, telephone or other communication devices, personal digital assistants (PDAs), or the like. In some illustrative examples, an off-premise device and an on-premise device may comprise a portable computing device that is configured with flash memory to provide non-volatile memory for storing operating system files and/or user-generated data. Thus, the system may essentially be any known or later-developed processing system without architectural limitation.

Proposed concepts may enhance a cloud-based service provisioning system by enabling dynamic data route selection to be implemented between the cloud and on-premise resources. Such proposals can extend or improve the processing capabilities, flexibility and/or efficiency of a cloud-based software delivery system.

Figure 1:
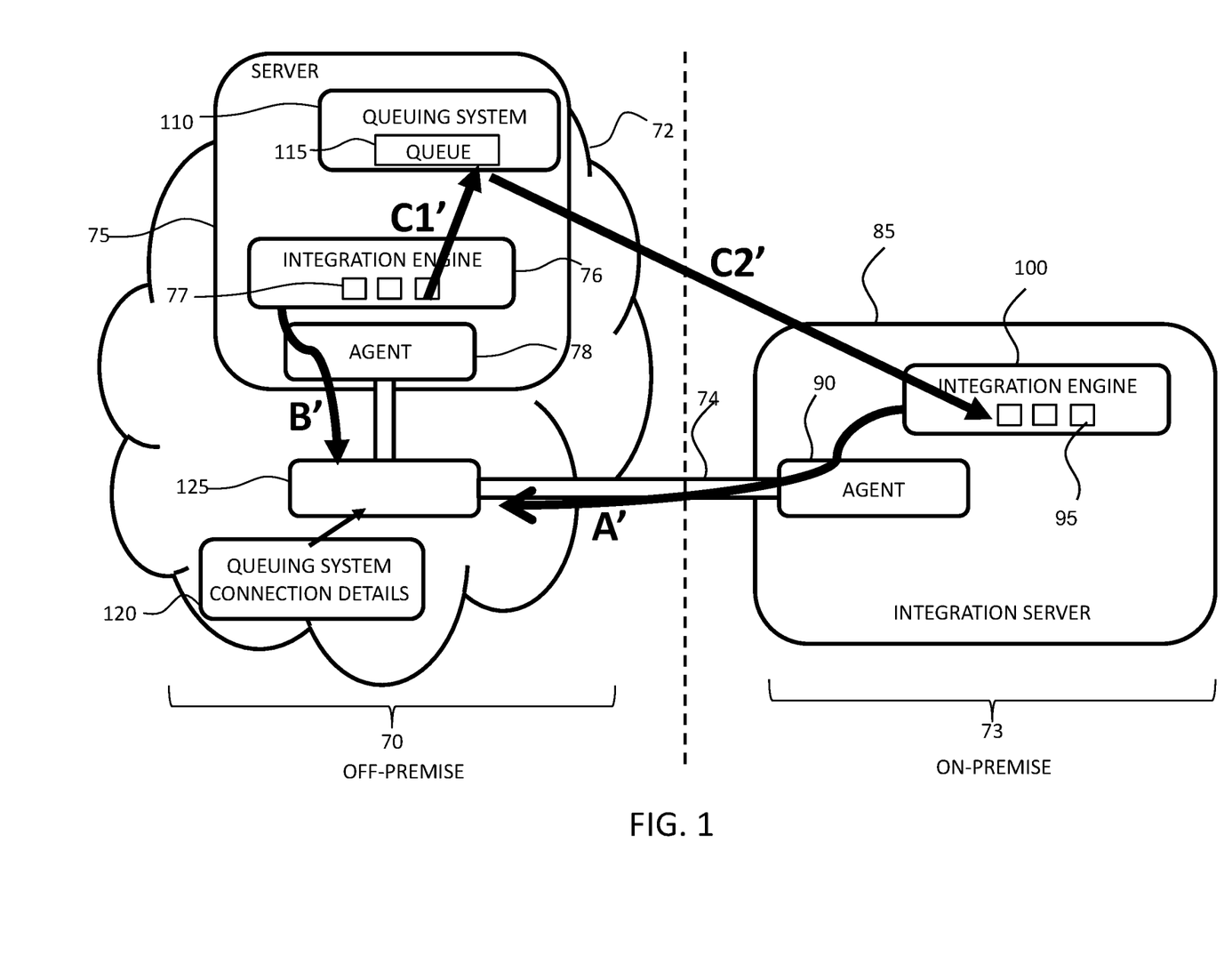
FIG. 1 depicts a block diagram illustrating an exemplary approach to configuring data communication with an application flow in a hybrid integration system, in accordance with an embodiment of the present invention.

Turning now to FIG. 1, illustrated is an exemplary approach to configuring data communication with an application flow in a hybrid integration system comprising off-premise resources 70 in a cloud environment 72 and on-premise resources 73, according to a proposed embodiment.

The hybrid integration system of FIG. 1 depicts an off-premise switch comprising a connectivity component 125 according to a proposed embodiment, and a queuing system 110 implementing a queue 115.

The connectivity component 125 is configured to facilitate both the dynamic setting up of connection routes to the callable application flows and the dynamic selection of the connection routes. A client may call a flow like it would for any other local application and then the connectivity component 125 responds with connection details 120 for different routes to the called flow. From the various connection routes provided, the calling client may select the most appropriate connection route 74 to the called application flow. For example, the client may select the connection route 74 in consideration of one or more factors, such as: network subnet; addressability of connection route 74; type of transport; current latency of transport; reliability of transport; schedule; size or complexity of data, etc.

The proposed configuration of FIG. 1 allows connection details 120 for the queuing system 110 to be configured on the connectivity component. Accordingly, in the integration system of FIG. 1, there is provided a queuing system 110 to which every agent 78, 90 can connect.

FIG. 1 also illustrates, by way of labelled arrows, a way in which connections are implemented according to proposed concepts.

As shown by the arrow labelled A', when an application flow 95 is deployed to integration engine 100 of the on-premise server 85, it registers its invoking nodes with the connectivity component 125. Application flow's 95 tunnel to the connectivity component 125 remains open and will accept connection details 120 for protocols to listen to for requests.

As a result of this deployment, the connectivity component 125 has a queuing system 110 configured to send to the callable flow 95. It then listens on that system for requests.

As shown by the arrow labelled B', when an application flow 77 is deployed to integration engine 76 of the off-premise server 75, it registers its invoking nodes with the connectivity component 125. Its tunnel to the connectivity component 125 remains open and will accept connection details 120 for protocols to listen to for requests. As a result of this deployment, the connectivity component 125 has a queuing system 110 configured to send to the callable application flow 77. It then listens on that system for requests.

Finally, as shown by the arrows labelled C1' and C2', when the invoking application flow 77 of the off-premise server 75 wants to call the callable application flow 95 of the on-premise server 85, it uses the connection details 120 provided by the connectivity component 125. The application flow 95 that is being invoked is already listening on the same queuing system because the connectivity component 125 provided the details when it registered. The application flow 77 invoking the callable application flow 95 can also decide to revert to send the request via the connectivity component 125, e.g., either because queuing system 110 has an issue like an outage or because it is configured to never use queuing as a connection route 74. Also, it might choose to ignore queuing connection routes because it does not want the quality of service that is provided by an asynchronous queuing system.

Thus, it will be appreciated that that the connectivity component 125 of the embodiment of FIG. 1 removes a need to have multiple switches for the connection route 74, because the connectivity component 125 facilitates sending the data via a different mechanism/protocol that can manage its own mechanisms.

Figure 2:
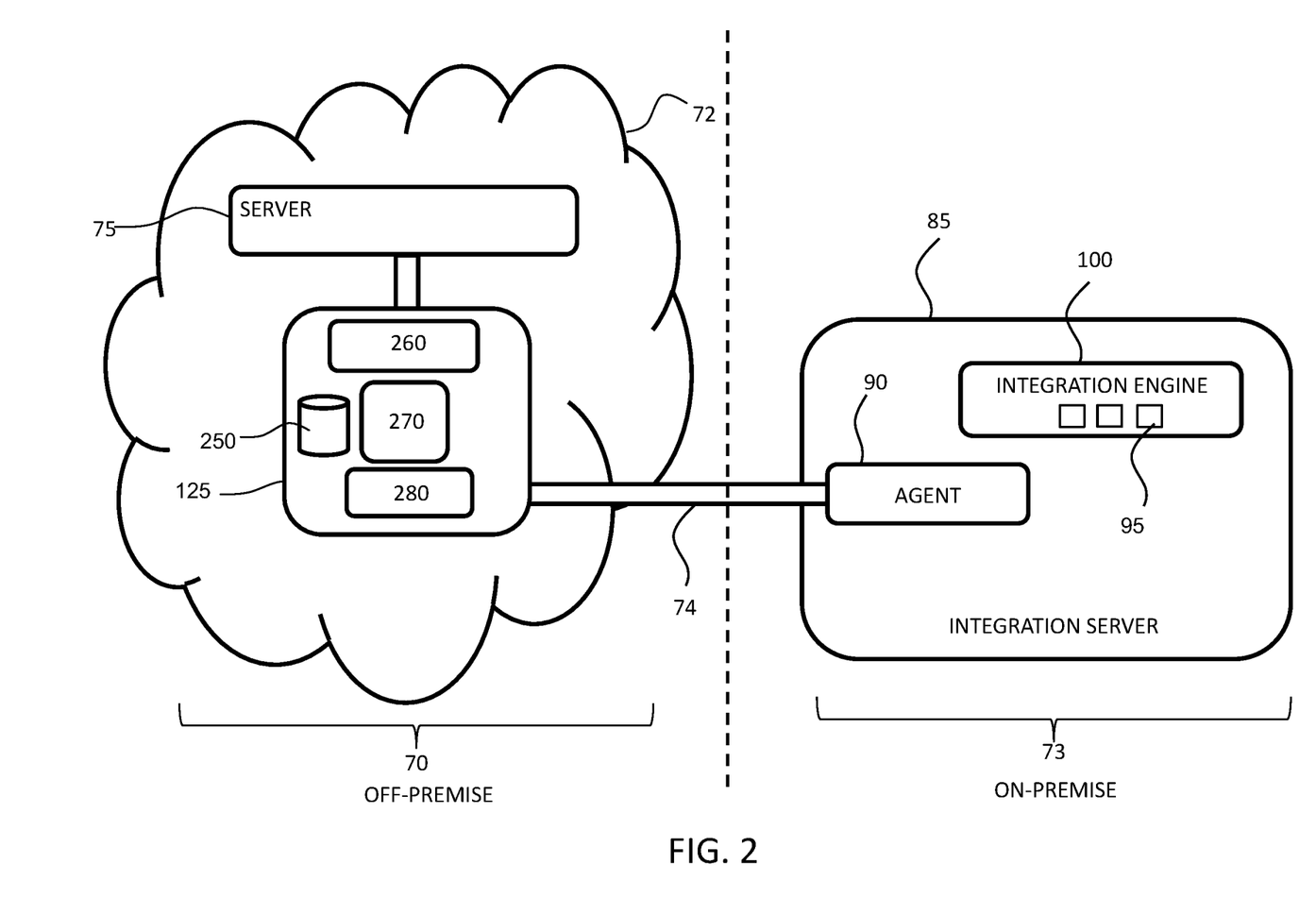
FIG. 2 depicts a modified version of FIG. 1, showing the connectivity component in more detail, in accordance with an embodiment of the present invention.

By way of further explanation, and with reference to FIG. 2, the connectivity component 125 is shown in more detail.

The connectivity component 125 comprises: an information store 250; a registration module 260; a configuration component 270; and a communication component 280.

The information store 250 is a data storage system that is configured to store configuration information associated with an application flow 95 such as: connection details 120 for an application flow 95; and client libraries for data transport to and/or from the application flow 95. Further, according to proposed concepts, connection configuration information may relate to a plurality of different connection routes to the associated application flow 95.

The connection configuration information may be provided to the connectivity component 125 from at least one of: an off-premise server 75; an on-premise server 85; an off-premise agent 78; and on-premise agent 90. By way of example, such an off-premise server 75 may comprise a cloud sever. For this purpose, the connectivity component 125 comprises a registration module 260 that is configured to receive connection configuration information associated with an application flow 95. The registration module 260 is configured to add connection configuration information to the information store 250, thus enabling the concept of registering connection configuration information with the connectivity component 125 so it may identify potential connection routes for a requested application flow 95. Also, the registration module 260 may be adapted to remove connection configuration information from the information store 250 in response to an application flow 95, a server, and/or an application becoming inaccessible (e.g. being disconnected, terminated, or powered down).

A registering client or application flow 77 may therefore register information to identify available connection routes. This registered information can then be used to connect routes to a called application flow 95. Put another way, the information store 250 may be adapted to be dynamically updated or maintained in order to reflect changes in available application flows 77, 95, resources and/or connection routes.

The information store 250 may therefore be thought of as providing a dynamically updated store of connection configuration information representing application flows 77, 95 that may be accessible and the available connection routes. In this way, the connectivity component 125 may adapt to implementation specifics and cater for changes in available resources, e.g., application flows 77, 95, servers and/or connection links, for the registration/deregistration of connection configuration information to/from the information store 250.

The communication component 280 is configured to receive an application flow 77, 95 request from a client. For this purpose, the communication component 280 is adapted to establish a secure tunnel for receiving the application flow 77, 95 request. By way of example, the application flow 77, 95 request comprises: an application name; a flow identifier; a client identifier; a data payload; and entry point data.

Upon receiving an application request, the communication component 280 passes the received request to the configuration component 270. The configuration component 270 is adapted to process the received request in conjunction with connection configuration information stored in the information store 250 in order to determine a requested application flow 77, 95 and stored connection configuration information. By way of example, configuration component 270 is configured to identify the requested application flow 77, 95, e.g., based on an application name included in the request, and the calling/requesting client, e.g., based on a client identifier included in the request. Further, based on the identified requested application flow 77, 95 and client, the configuration component 270 is then adapted to query the information store 250 to identify connection configuration information associated with the identified requested application flow 77, 95 and the client.

The configuration component 270 passes the identified connection configuration information to the communication component 280. The communication component 280 is adapted to communicate the identified connection configuration information back to the client. For this purpose, the communication component 280 is adapted to establish a secure tunnel for communicating the identified connection configuration information. For example, the communication component 280 may establish a mutually authenticated TLS tunnel connection between the connectivity component 125 and the calling agent.

Thus, from the description above, the connectivity component 125 may be thought of as having a secure communication component 280 for establishing tunnels with off-premise and on-premise server modules. The connectivity component 125 may also be thought of as including a registration module 260 that is adapted to register and store, in a data store of the connectivity component 125, connection configuration information associated with application flows, e.g., connection details 120 for an application flow 77, 95; and client libraries for data transport to and/or from the application flow 77, 95. Clients may therefore register connection configuration information with the connectivity component 125 when they connect and/or when a configuration changes. Such information may also be deregistered, e.g., removed or deleted from the data store, when an application flow 77, 95 becomes inaccessible. Received calls, e.g., requests, for an application flow 77, 95 may be analyzed by the connectivity component 125 and used to query the dynamically maintained information store 250 to identify connection configuration information indicative of a plurality of connection routes to the requested application flow 77, 95.

Purely by way of further illustration of the proposed concepts, we will now consider a modification to the embodiments of FIGS. 1 and 2. More specifically, with reference to FIG. 3, we will consider another exemplary approach to configuring data communication with an application flow in a hybrid integration system according to a proposed embodiment, wherein the first queueing system 300 and second queuing system 310 are provided off-premise. Here, the first queuing system 300 is labelled as "QUEUEING SYSTEM A" and the second queuing system 310 is labelled as "QUEUEING SYSTEM B".

Figure 3:
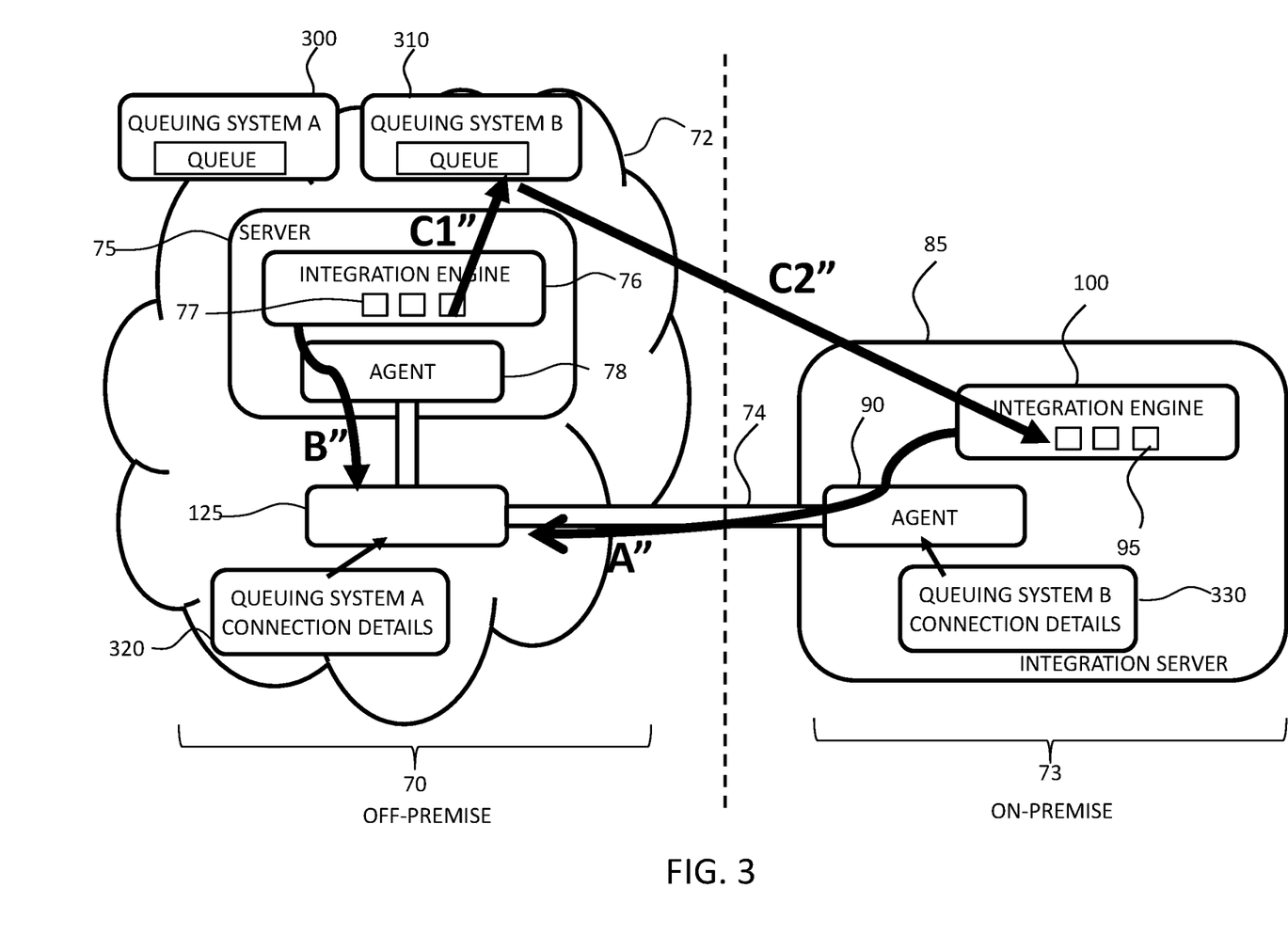
FIG. 3 depicts a modified version of combined FIGS. 1 and 2, in accordance with an embodiment of the present invention.

The hybrid integration system of FIG. 3 is similar to the embodiment of FIGS. 1 and 2 but differ in that the off-premise resources comprise multiple switch queuing systems, e.g., first queueing system 300 and second queueing system 310. As before, the connectivity component 125 is configured to facilitate both the dynamic setting up of connection routes to callable application flows 77, 95 and the dynamic selection of such connection routes. A client may call an application flow, 77, 95 like it would for any other local application and then the connectivity component 125 responds with connection details for different routes to the called application flow 77, 95.

The proposed configuration of FIG. 3 allows connection details for the first queueing system 300 and the second queuing system 310 to be configured on the connectivity component 125. Accordingly, in the integration system of FIG. 3, there are provided a first queuing system 300 and a second queuing system 310 to which agents 78, 90 can connect. Accordingly, in this example, as well as the connectivity component 125 having a queuing system for sending data, the on-premise agent 90 can also have a queuing system configured.

FIG. 3 illustrates, by way of labelled arrows, a way in which connections are implemented according to proposed embodiment concepts.

As shown by the arrow labelled A", when an application flow 95 is deployed to integration engine 100 of the on-premise server 85, it registers its invoking nodes with the connectivity component 125. Its tunnel to the connectivity component 125 remains open and it will accept connection details for protocols to listen to for requests. It will listen to these as well as to listening on its own queuing system. The agent 90 will then listen on both queuing systems and allow requests directly from the connectivity component 125.

As shown by the arrow labelled B", when an application flow 77 is deployed to integration engine 76 of the off-premise server 75, it registers its invoking nodes with the connectivity component 125. Its tunnel to the connectivity component 125 remains open and it will accept connection details for protocols to listen to when sending requests. In this case, it will receive two sets of queuing system details: the QUEUING SYSTEM A connection details 320 configured on the connectivity component 125 and the QUEUING SYSTEM B connection details 330 registered by the on-premise agent 90. For example, they are provided in an ordered list with the agent 90 queuing system coming first followed by the connectivity component defined one next.

As shown by the arrows labelled C1" and C2", when the invoking application flow 77 of the off-premise server 75 wants to call the callable application flow 95 of the on-premise server 85, it uses the connection details provided by the connectivity component 125. It will select the second queuing system 310 details that would be the on-premise agent's 90 preferred queuing system. It could also use other selection criteria at this point to choose a connection route 74 other than the order like: the sub net of the queuing system, e.g., use one that is closest to its own address; or choose a queuing system that it can address. It is noted that it could change the choice of route at a later point, e.g. based on latency, throughput and errors.

By way of yet further illustration of the proposed concepts, we will now consider a modification to the embodiment of FIG. 3. More specifically, with reference to FIG. 4, we will consider another exemplary approach to configuring data communication with an application flow 77, 95 in a hybrid integration system according to a proposed embodiment, wherein first integration server 85 and second integration server 400 are provided on-premise.

Figure 4:
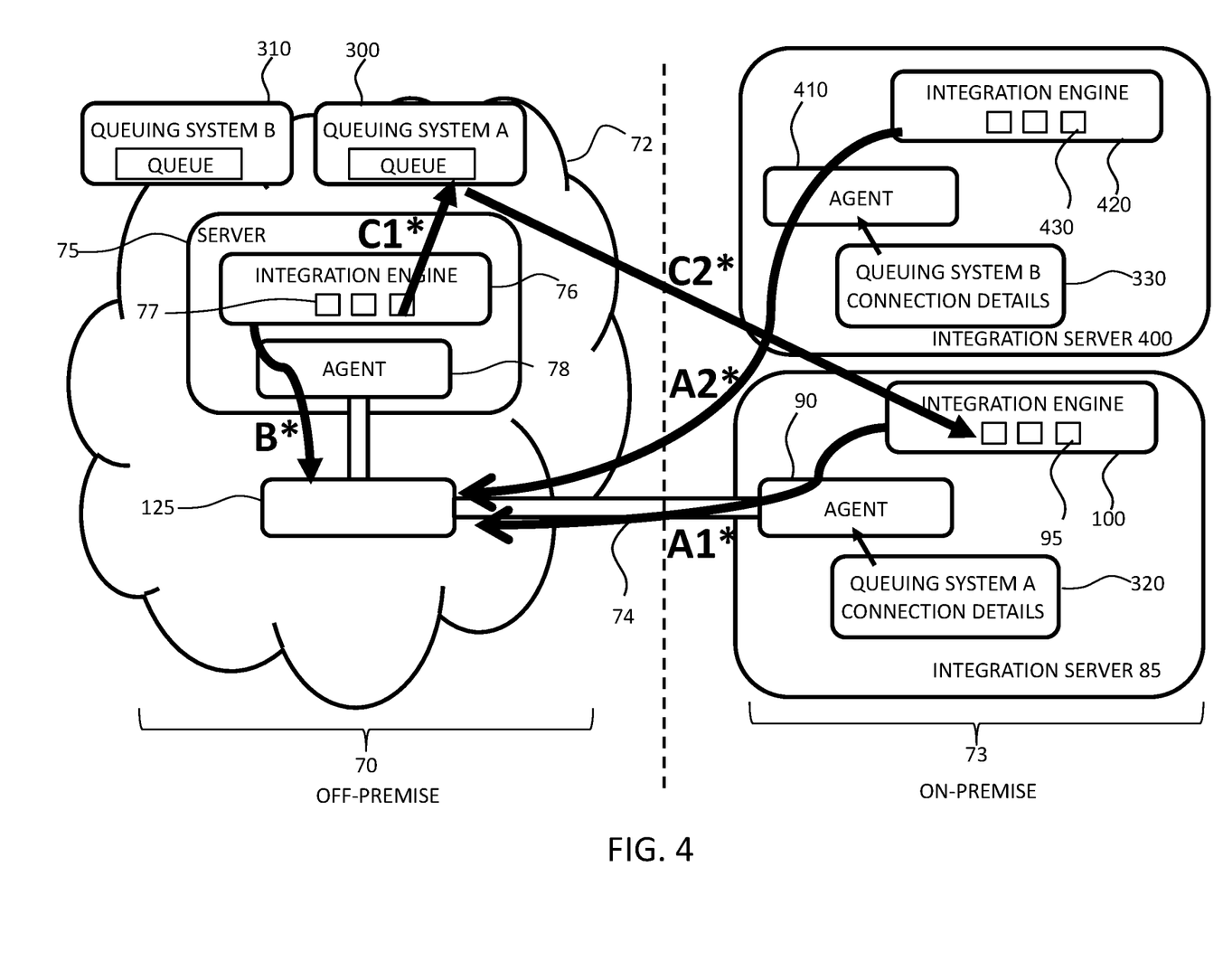
FIG. 4 depicts a modified version of FIG. 3, in accordance with an embodiment of the present invention.

Specifically, the on-premise resources 73 of the modified embodiment of FIG. 4 further comprise a second on-premise server 400 (in addition to the first on-premise server 85). The second on-premise server 400 comprises an agent 410 for communication with the connectivity component 125. The second on-premise server 400 also comprises an integration engine 420 implementing application flow 430.

The hybrid integration system of FIG. 4 is thus similar to the embodiment of FIG. 3 but differs in that the on-premise resources 73 comprise multiple integration server 85, 400. As before, the connectivity component 125 is configured to facilitate both the dynamic configuration of connection routes to callable application flows 430 and the dynamic selection of such connection routes. A client may call an application flow 430 like it would for any other local application and then the connectivity component 125 responds with connection details for different routes to the called application flow 430.

The proposed configuration of FIG. 4 allows connection details for the first queueing system 300 and second queuing system 310 to be configured on the connectivity component 125. Accordingly, in the integration system of FIG. 4, there are provided a first queueing system 300 and second queuing system 310 to which agents 78, 90, 410 can connect. Accordingly, in this example, as well as the on-premise agent 90 of the first integration server 85 having a queuing system for sending data, the on-premise agent 410 of the second integration server 400 can also have a queuing system configured. Thus, in this example, two agents 90, 410 both register the same callable application flows 95, 410 and both provide different queuing system details.

According to proposed embodiment concepts, a calling application flow 77 can call any of the two copies of the application flows 95, 430 rather than the agent 90, 410, as it is the application flows 95, 430 that will be listening on the queues 320, 330.

By way of example, FIG. 4 illustrates, using labelled arrows, as a way in which connections are implemented according to proposed embodiment concepts.

As shown by the arrow labelled A1*, when an application flow 95 is deployed to integration engine 100 of the first on-premise server 85, it registers its invoking nodes with the connectivity component 125. Application flow's 95 tunnel to the connectivity component 125 remains open and it will accept connection details for protocols to listen to for requests. Application flow 95 will listen to these as well as listening on its own queuing system. The agent 90 will then listen on both queuing systems and allow requests directly from the connectivity component 125.

Similarly, as shown by the arrow labelled A2*, when an application flow 430 is deployed to integration engine 420 of the second on-premise server 400, it registers its invoking nodes with the connectivity component 125. Application flow's 430 tunnel to the connectivity component 125 remains open and it will accept connection details for protocols to listen to for requests. Application flow 430 will listen to these as well as listening on its own queuing system. The agent 410 of the second on-premise server 400 will then listen on both queuing systems and allow requests directly from the connectivity component 125.

As shown by the arrow labelled B*, when an application flow 77 is deployed to integration engine 76 of the off-premise server 75, it registers its invoking nodes with the connectivity component 125. Application flow's 77 tunnel to the connectivity component 125 remains open and it will accept connection details for protocols to listen/use when sending requests. In this case, application flow 430 will receive two sets of queuing system details: the QUEUING SYSTEM A connection details 320 registered by the on-premise agent 90 of the first on-premise server 85; and the QUEUING SYSTEM B connection details 330 registered by the on-premise agent 410 of the second on-premise server 400.

As shown by the arrows labelled C1* and C2*, when the invoking application flow 77 of the off-premise server 75 wants to call the callable application flow 95 of the first on-premise server 85, application flow 77 uses the connection details provided by the connectivity component 125. It will select the first queuing system 300 details that would be the on-premise agent's 90 preferred queuing system. It could also use other selection criteria at this point to choose the connection route 74 other than the order like: the sub net of the queuing system, e.g., use one that is closest to its own address; or choose a queuing system that it can address. It is noted that it could change the choice of route at a later point, e.g. based on latency, throughput and errors.

It is noted in that in the above-described embodiments, when an agent leaves or joins the system, any integration server that is registered as a caller may be notified via the connectivity component 125 of the change in available queuing systems. It will stop sending to agents that have left and start sending to any new agents if they fulfill its selection criteria. In this way, connection configuration information may be distributed and changed dynamically as needed.

It will be appreciated that the illustrated example is simplified and that it is possible to make the system as complex as needed for a user to meet requirements. For instance, many agents and many different queuing systems (both on public and private networks) may be incorporated. Such complexity may be added and/or removed dynamically as needed without changing any deployed artefacts like integration engines or application flows.

Further, although the illustrated examples employ queuing systems for the connection route 74, other protocols, e.g., REST, can also be configured. An agent may then decide, based on the provided connection configuration information, which route to use. For example, some routes may not be accessible or may offer the wrong quality of service. However, embodiments may always provide the fall-back option of connecting via the connectivity component 125 rather than using a separate route.

As detailed above, the information store 250 of a connectivity component 125 may be dynamically or automatically maintained using a registration/deregistration process. Thus, in addition to implementing an information registration method, an information de-registration method (not shown) may also be employed. Such processes may be executed in response to changes in connectivity, user(s) or application resources for example.

As will be apparent from the above description, an off-premise resource may be provided by a cloud-computing system. Also, a connectivity component 125 or method for configuring data communication with an application flow in an integration system may be provided or implemented by a cloud-computing system.

With reference to the following description made with regard to a cloud computing system, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed. The following description of a cloud computing system and environment is made purely for the purposes of explanation and understanding.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This off-premise cloud model may include at least five characteristics, at least three service models, and at least four deployment models.

Characteristics are as follows: On-demand self-service: a cloud consumer can unilaterally provide computing capabilities, such as server time and network storage, as needed automatically without requiring human interaction with the service's provider. Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time. Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises. Community cloud: the cloud infrastructure is shared by several organizations and supports a specific community that has shared concerns (e.g., mission, security requirements, policy, and compliance considerations). It may be managed by the organizations or a third party and may exist on-premises or off-premises. Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load-balancing between clouds). A cloud computing environment is service oriented with a focus on statelessness, low coupling, modularity, and semantic interoperability. At the heart of cloud computing is an infrastructure comprising a network of interconnected nodes.

Figure 5:
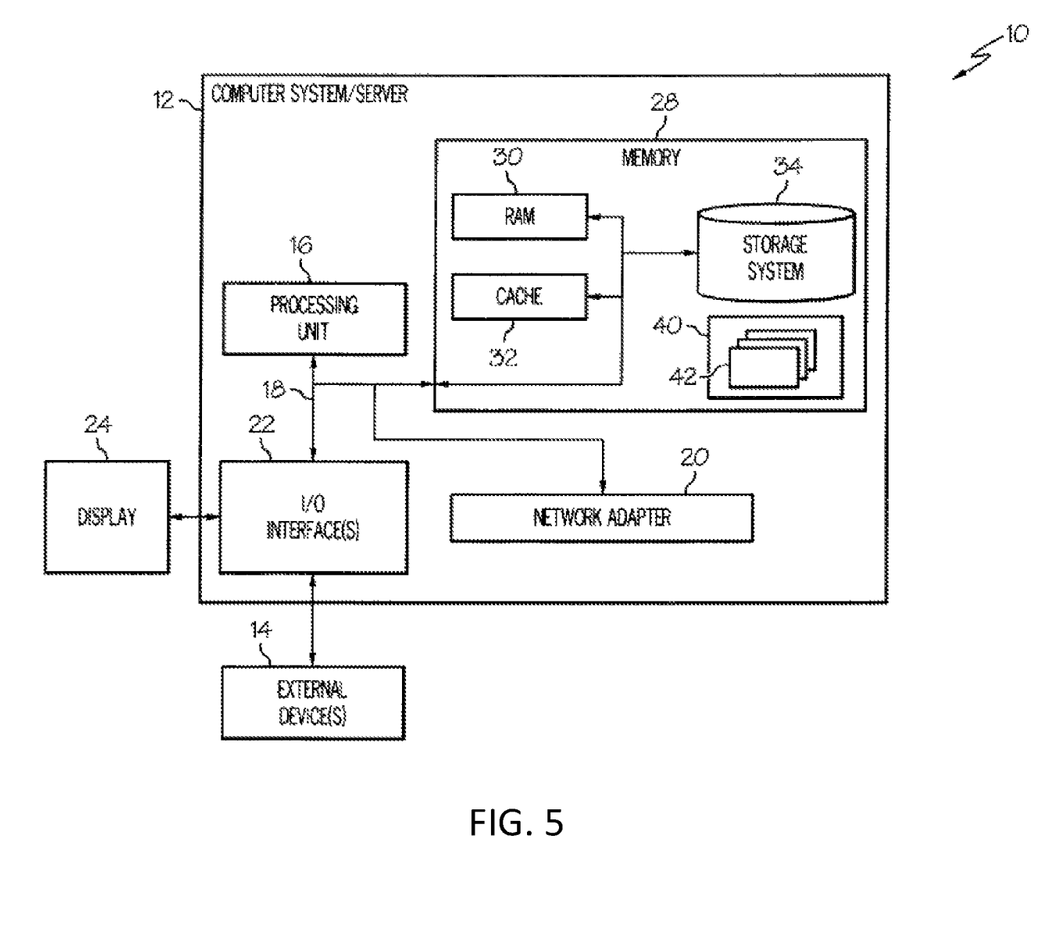
FIG. 5 illustrates a cloud system node suitable for use in the embodiments, in accordance with an embodiment of the present invention.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
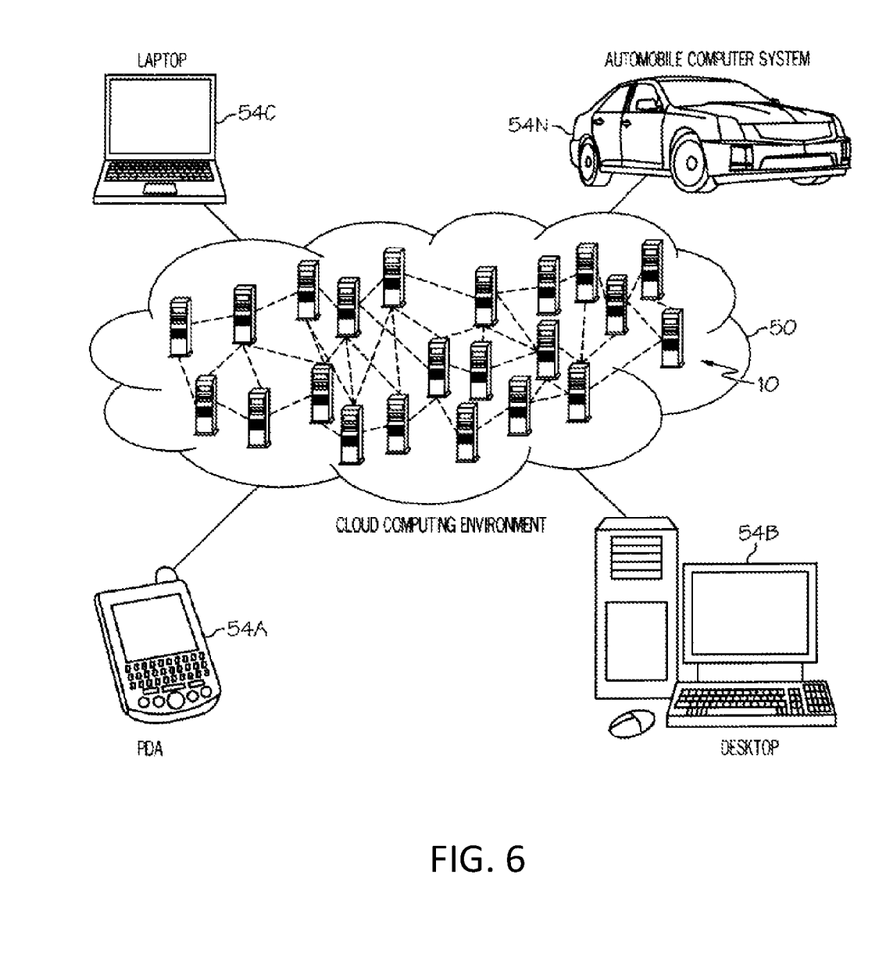
FIG. 6 illustrates a cloud computing environment suitable for use in accordance with an embodiment of the present invention.

Referring now to FIG. 6, illustrative cloud computing environment or cloud computing system 50 is depicted. This can, in embodiments, be equated to the cloud computing system as depicted in FIG. 1 for example. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
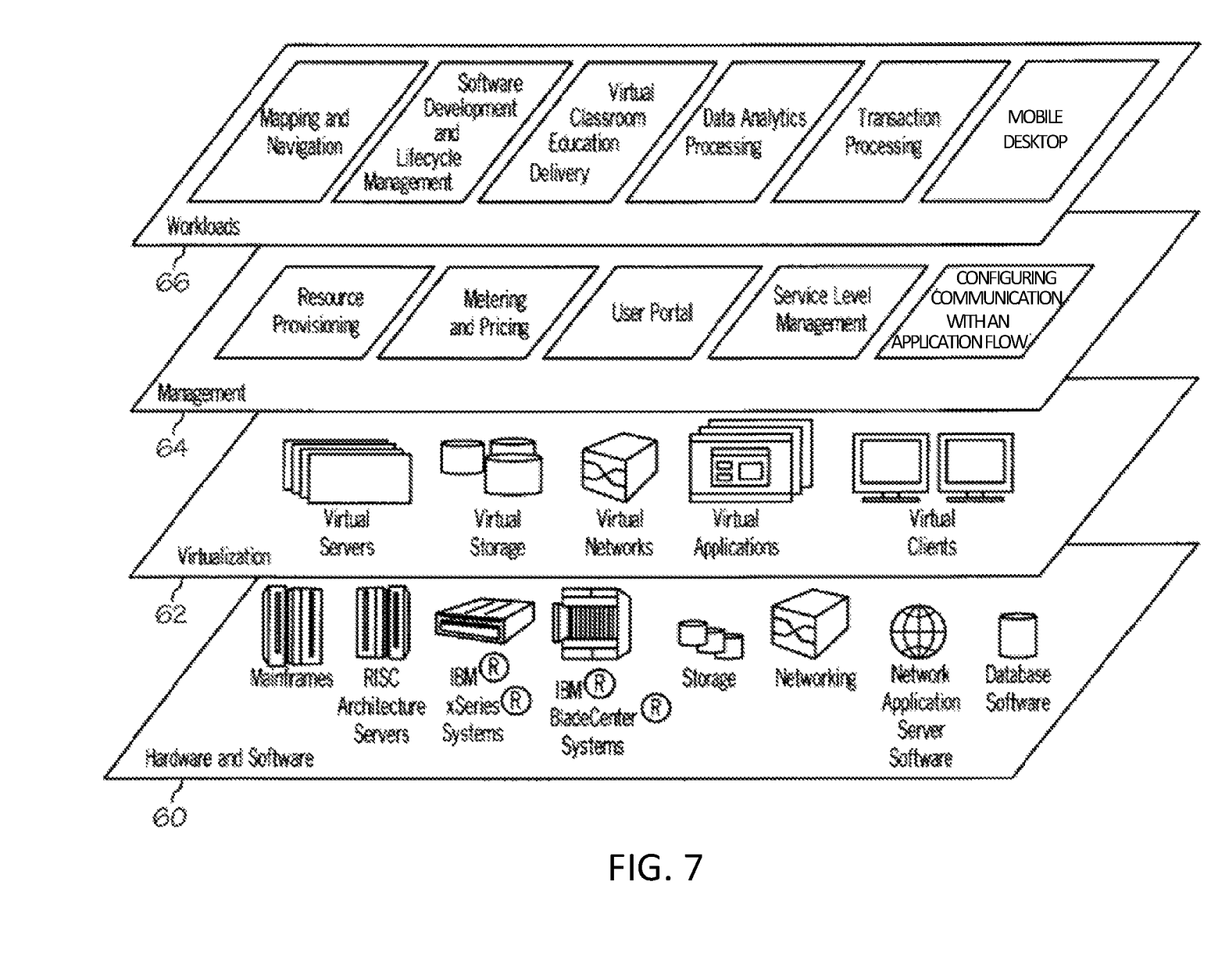
FIG. 7 illustrates cloud abstraction mode layers suitable for use in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Configuring communication with an application flow provides for configuring communication according to proposed concepts as detailed above.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A connectivity component for configuring data communication with an application flow in an integration system, the connectivity component comprising:
   an information storage device adapted to store connection configuration information associated with one or more application flows;
   a registration module adapted to receive connection configuration information associated with an application flow, wherein the received connection configuration information relates to at least two different connection routes to the associated application flow, and to add or remove the connection configuration information to/from the information storage device based on the availability of the application flow;
   a configuration component configured to identify stored connection configuration information, associated with an application flow, based on a first client initiating a connection to the application flow; and
   a communication component adapted to communicate the identified connection configuration information to the first client, wherein the identified connection configuration information comprises a plurality of connection routes for selection by the first client based on factors comprising network subnet, type of transport, current latency of transport, reliability of transport, communication schedule, size of data and complexity of data.

2. The connectivity component of claim 1, wherein the registration module is configured to receive the connection configuration information associated with an application flow from at least one of an off-premise server, an on-premise server, an off-premise agent, or an on-premise agent.

3. The connectivity component of claim 2, wherein the off-premise server comprises a cloud server.

4. The connectivity component of claim 1, wherein connection configuration information for a connection route comprises at least one of connection details for the application flow, client libraries for data transport to the application flow or client libraries for data transport from the application flow.

5. The connectivity component of claim 1, wherein the communication component is adapted to establish a secure tunnel for communicating the identified connection configuration information.

6. The connectivity component of claim 1, wherein communication component is further configured to receive an application flow request from the first client, and wherein the configuration component is configured to identify stored connection configuration information for the first client based on the received application flow request.

7. The connectivity component of claim 6, wherein the application flow request comprises at least one of an application name, a flow identifier, a data payload, or entry point data.

8. A switch module, the switch module comprising:
   a connectivity component, wherein the connectivity component comprises:
      an information storage device adapted to store connection configuration information associated with one or more application flows;
      a registration module adapted to receive connection configuration information associated with an application flow, wherein the received connection configuration information relates to at least two different connection routes to the associated application flow, and to add or remove the connection configuration information to/from the information store based on the availability of the application flow;
      a configuration component configured to identify stored connection configuration information, associated with an application flow, based on a first client initiating a connection to the application flow; and
      a communication component adapted to communicate the identified connection configuration information to the first client, wherein the identified connection configuration information comprises a plurality of connection routes for selection by the first client based on factors comprising network subnet, type of transport, current latency of transport, reliability of transport, communication schedule, size of data and complexity of data.

9. The switch module of claim 8, wherein the registration module is configured to receive the connection configuration information associated with an application flow from at least one of an off-premise server, an on-premise server, an off-premise agent, or an on-premise agent.

10. The switch module of claim 9, wherein the off-premise server comprises a cloud server.

11. The switch module of claim 8, wherein connection configuration information for a connection route comprises at least one of connection details for the application flow, client libraries for data transport to the application flow or client libraries for data transport from the application flow.

12. A server device, the server device comprising:
   a switch module, wherein the switch module further comprises:
      a connectivity component, wherein the connectivity component further comprises:
         an information storage device adapted to store connection configuration information associated with one or more application flows;
         a registration module adapted to receive connection configuration information associated with an application flow, wherein the received connection configuration information relates to at least two different connection routes to the associated application flow, and to add or remove the connection configuration information to/from the information store based on the availability of the application flow;
         a configuration component configured to identify stored connection configuration information, associated with an application flow, based on a first client initiating a connection to the application flow; and
         a communication component adapted to communicate the identified connection configuration information to the first client, wherein the identified connection configuration information comprises a plurality of connection routes for selection by the first client based on factors comprising network subnet, type of transport, current latency of transport, reliability of transport, communication schedule, size of data and complexity of data.

13. The server device of claim 12, wherein the registration module is configured to receive the connection configuration information associated with an application flow from at least one of an off-premise server, an on-premise server, an off-premise agent, or an on-premise agent.

14. The server device of claim 12, wherein connection configuration information for a connection route comprises at least one of connection details for the application flow, client libraries for data transport to the application flow or client libraries for data transport from the application flow.

15. The server device of claim 12, wherein the server device is adapted to act as a switching component between an on-site server and an off-site server.

16. The server device of claim 12, wherein the server device is adapted to implement a part of a SaaS architecture.

17. A computer-implemented method for configuring data communication with an application flow in an integration system, the computer-implemented method comprising:
   storing, in an information store, connection configuration information associated with one or more application flows;
   receiving connection configuration information associated with an application flow, wherein the received connection configuration information relates to at least two different connection routes to the associated application flow;
   adding or removing the connection configuration information to/from the information store based on the availability of the application flow;
   identifying stored connection configuration information, associated with an application flow, based on a first client initiating a connection to the application flow; and
   communicating the identified connection configuration information to the first client, wherein the identified connection configuration information comprises a plurality of connection routes for selection by the first client based on factors comprising network subnet, type of transport, current latency of transport, reliability of transport, communication schedule, size of data and complexity of data.

18. The computer-implemented method of claim 17, wherein receiving the connection configuration information associated with an application flow is from at least one of an off-premise server, an on-premise server, an off-premise agent, or an on-premise agent.

19. The computer-implemented method of claim 17, wherein the off-premise server comprises a cloud sever.

20. The computer-implemented method of claim 17, wherein connection configuration information for a connection route comprises at least one of connection details for the application flow, client libraries for data transport to the application flow or client libraries for data transport from the application flow.

21. The computer-implemented method of claim 17, wherein communicating the identified connection configuration information comprises establishing a secure tunnel for communicating the identified connection configuration information.

22. The computer-implemented method of claim 17, further comprising:
   receiving an application flow request from the first client, and
   wherein identifying stored connection configuration information comprises identifying stored connection configuration information for the first client based on the received application flow request.

23. The computer-implemented method of claim 22, wherein the application flow request comprises at least one of an application name, a flow identifier, a data payload or entry point data.

24. A computer program product for configuring data communication with an application flow in an integration system, the computer program product comprising:
   a computer readable storage medium having program instructions embodied therewith, the program instructions executable by a processing unit to cause the processing unit to perform a method comprising:
      storing, in an information store, connection configuration information associated with one or more application flows;
      receiving connection configuration information associated with an application flow, wherein the received connection configuration information relates to at least two different connection routes to the associated application flow;
      adding or removing the connection configuration information to/from the information store based on the availability of the application flow;
      identifying stored connection configuration information, associated with an application flow, based on a first client initiating a connection to the application flow; and
      communicating the identified connection configuration information to the first client, wherein the identified connection configuration information comprises a plurality of connection routes for selection by the first client based on factors comprising network subnet, type of transport, current latency of transport, reliability of transport, communication schedule, size of data and complexity of data.

25. The computer program product of claim 24, wherein receiving the connection configuration information associated with an application flow is from at least one of an off-premise server, an on-premise server, an off-premise agent, or an on-premise agent.

* * * * *